United States Patent [19]

Mitschelen et al.

[11] Patent Number: 5,366,196
[45] Date of Patent: Nov. 22, 1994

[54] DEVICE FOR ADJUSTING VEHICLE SEATS

[75] Inventors: Rolf Mitschelen, Kirchheim; Gunter Siegel, Horb, both of Germany

[73] Assignee: Mercedes-Benz AG, Germany

[21] Appl. No.: 897,935

[22] Filed: Jun. 15, 1992

[30] Foreign Application Priority Data

Jun. 13, 1991 [DE] Germany .............. 4119418

[51] Int. Cl.$^5$ .............................. B60N 2/04
[52] U.S. Cl. .................... 248/424; 248/419; 248/421; 248/550; 297/344.1
[58] Field of Search ............ 248/421, 424, 419, 393, 248/550; 297/344.1, 344.14

[56] References Cited

U.S. PATENT DOCUMENTS

| | | | |
|---|---|---|---|
| 2,256,004 | 9/1941 | Thomas | 248/424 X |
| 2,920,684 | 1/1960 | Fante et al. | 248/421 X |
| 3,006,594 | 10/1961 | Gruendler | 248/424 |
| 3,033,510 | 5/1962 | Hollar et al. | 248/394 |
| 3,136,524 | 6/1964 | Pickles | 248/424 |
| 3,188,044 | 6/1965 | Epple | 248/419 |
| 4,511,110 | 4/1985 | Möller | 248/421 |
| 4,828,213 | 5/1989 | Saito et al. | 248/421 |
| 5,007,611 | 4/1991 | Kanai | 248/421 |

FOREIGN PATENT DOCUMENTS

| | | |
|---|---|---|
| 0029997 | 6/1981 | European Pat. Off. . |
| 2158976 | 6/1973 | France . |
| 2652043 | 3/1991 | France . |
| 3843684 | 7/1990 | Germany . |
| 2037578 | 7/1980 | United Kingdom ........ 248/419 |
| 2187379 | 9/1987 | United Kingdom ........ 248/421 |

Primary Examiner—Rinaldi I. Rada
Assistant Examiner—Clark F. Dexter
Attorney, Agent, or Firm—Evenson, McKeown, Edwards & Lenahan

[57] ABSTRACT

A device for adjusting vehicle seats, in particular, motor vehicle seats having, link mechanisms which, for the adjustable securement of the seat to the vehicle floor on a cushion-receiving frame of the seat, act near to the front and rear end of the seat frame upon its longitudinal sides. A locking unit engages into at least one link mechanism for locking the seat in a desired seat position. For the purpose of adjusting the seat in the longitudinal direction in a straight line or with superimposed adjustment for height and inclination, and for extreme displacement of the seat for the purpose of facilitating passage to the rear seating positions in the case of two-door vehicles, each of the two front and rear link mechanisms exhibits a link pivotably mounted on the seat frame and two mutually intersecting cross-links. The cross-links are attached by their one end to the link at a distance from its bearing point and are pivotably secured by their other end, at a distance apart, on the vehicle floor side. The locking unit acts, in this case, upon a link.

15 Claims, 4 Drawing Sheets

DEVICE FOR ADJUSTING VEHICLE SEATS

BACKGROUND AND SUMMARY OF THE INVENTION

The invention relates to a device for adjusting vehicle seats, such as motor vehicle seats, and, more particularly, to a vehicle seat adjusting device having link mechanisms which, for the adjustable securing of the seat to the vehicle floor by a cushion-receiving frame of the seat, act near to the front and rear end of the seat frame upon its longitudinal sides, and a locking unit engaging into at least one link mechanism for locking the seat movement in a desired seat position.

In a known seat adjusting device of this general type as shown in DE 38 43 684 A1, each of the two front link mechanisms comprises a supporting lever pivotably mounted at its bottom end section on a guide rail disposed in longitudinally displaceable manner on the vehicle floor and at its upper end section on the seat frame. The two front supporting levers can be connected to each other by a traverse bar. Each of the two rear link mechanisms exhibits, in addition to an identical supporting lever, a rocker arm, which is pivotably mounted at the upper hinge point of the supporting lever. Fastened to the rocker arm is a toothed segment, extending approximately perpendicularly upwards therefrom, into which a locking pawl, which is pivotably mounted on the seat frame, engages such that it can be lifted out. The toothed segment and the locking pawl form the locking unit by which the seat can be locked in its desired height and inclination position. In place of the locking pawl, a cogwheel, driven by a servo motor and rotatably mounted on the seat frame, can also mesh with the toothed segment. The cogwheel, toothed segment and servo motor form a drive mechanism for the motor-driven adjustment of the seat and assume, at the same time, the function of the locking unit when the servo motor is not running.

Using this known adjusting device, however, the seat can only be adjusted in terms of height and inclination. The longitudinal adjustment is realized separately in the longitudinal guide rail secured to the motor vehicle floor.

An object of the present invention is to provide a seat adjusting device, which, in order to facilitate passage to seating positions located behind the driver-side and passenger-side seat backrests in two-door vehicles, allowing for an extreme longitudinal adjustment of the seat, can be easily equipped with a mechanical memory so that, following retraction of the seat, recovery of the original position is automatically guaranteed, and, for the seat adjustment, various path lines, e.g. change of inclination of the seat cushion over the longitudinal adjustment path, can be easily represented.

This object has been achieved according to the present invention with a seat adjusting device in which each of the four link mechanisms has a link, pivotably mounted on the seat frame or on the vehicle floor side, and two mutually intersecting cross-links, which are attached by their one end to the link at a distance from its bearing point and are pivotably secured by their other end, at a distance apart, on the vehicle floor side or to the seat frame, and the locking unit acts upon at least one of the links.

In the seat adjusting device according to the present invention, a plurality of different path lines for the seat adjustment can be represented by a variation in the lengths of the links and cross-links in the link mechanisms and by the position of their bearing and hinge points. As a result of an adjustability of some of these bearing and linkage points, height and inclination adjustments can be simultaneously realized. For improved access to the rear seating positions in the case of two-door vehicles, the seat can be moved a long way forward, so that a large pass-through space is made available.

The seat adjusting device according to the present invention is smooth-running, play-free and light, and inexpensive to manufacture from a production engineering viewpoint. It is also insensitive to installation tolerances and is easy to secure to the vehicle floor.

According to one feature of a currently preferred embodiment of the present invention, the mounting of the links or cross-links, on the vehicle floor side, is carried out on a one-part or two-part base frame firmly or detachably connected to the vehicle floor. This arrangement has the advantage that the adjusting device with seat can be assembled complete outside the vehicle and can be inserted easily and quickly into the vehicle as a constructional unit. In the case of detachable locking to the vehicle floor, the seat can be removed from the vehicle without difficulty. The bipartite form of the base frame has the advantage that, once one of the two frame parts has been released, the seat can be folded forwards or backwards via the hinge points of the cross-links and links on the other frame part.

The locking unit in the seat adjusting device can be easily effected by the fact that, according to a further aspect of the invention, one link is configured as a full or partial disc, an arc-shaped toothed segment is rigidly connected to the disc, and a toothed pawl, which is pivotably mounted on the seat frame or on the vehicle floor side, engages into the toothed segment. The toothed segment is locked in the engagement position or freed therefrom as desired by a locking Cam which is actuated either manually, e.g. by a release lever, or coupled to the forward folding movement of a backrest secured pivotably to the seat cushion.

According to another advantageous feature of the present invention, a mechanical memory can be achieved disposing a connecting link concentrically to the disc. The connecting link is rotatable relative to the disc and bears a radial recess for the engagement of a locking pawl mounted on the seat frame or on the vehicle floor side. The disc has a plurality of memory holes disposed on a circular path, and the connecting link pivotably bears a memory pawl which, as a result of spring pretensioning, is able to engage by its one pawl end into the memory holes to create a non-rotatable connection between the disc and the connecting link. The locking pawl and the memory pawl are associated with one other such that the locking pawl, upon its engagement into the connecting link recess, lifts the memory pawl out of the memory hole and, upon being lifted out of the connecting link recess, frees the memory pawl to engage into a memory hole. The locking pawl can be manually actuated for the purpose of being lifted out and engaging into the connecting link recess. The locking pawl actuates the locking cam for the locking and release of the toothed pawl of the locking unit. Advantageously, the actuation of the locking pawl is coupled to the folding movement of the backrest which is swivelled in the direction of the seat cushion for the purpose of clearing a passage to the rear vehicle seats.

BRIEF DESCRIPTION OF THE DRAWINGS

These and further objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
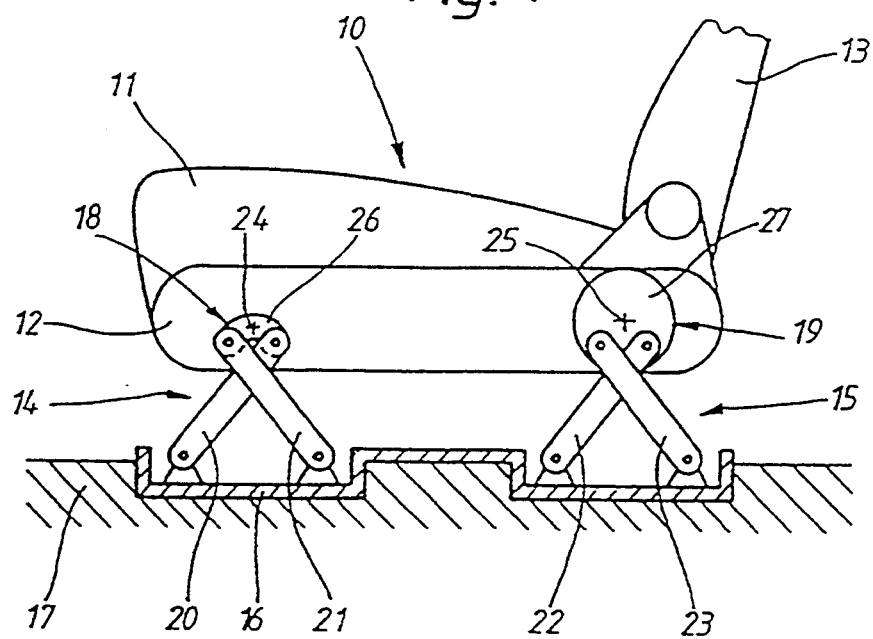
FIG. 1 is a side view of a vehicle seat with a seat-adjusting device in accordance with the present invention.

The motor vehicle seat 10 schematically represented in side view in FIG. 1 includes a seat cushion 11, which is received by a seat frame 12, and a backrest 13 attached to the seat frame 12. The seat frame 12 is connected by a seat adjusting device, comprising four link mechanisms acting near to the front and rear end of the seat frame upon its two longitudinal sides, to a one-part base frame 16, which is secured firmly or detachably to the vehicle floor 17.

Figure 7:
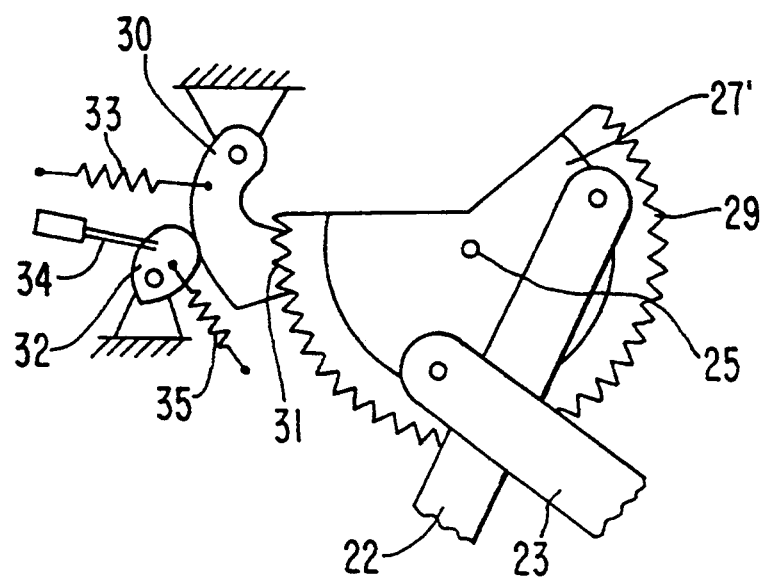
FIG. 7 is a cut-away view of an embodiment where the disk forming the link in the rear link mechanism is a partial disk.

Of the four link mechanisms, only the two link mechanisms situated on the one longitudinal side of the seat frame 12, more precisely the front link mechanism 14 and the rear link mechanism 15, can be seen in FIG. 1. The two front link mechanisms 14 and the two rear link mechanisms 15 can additionally be coupled to one another, by, for example, tranverse bars. Each link mechanism 14, 15 has a link 18 or 19, pivotably mounted on the seat frame 12, and two mutually intersecting cross-links 20, 21 or 22, 23, which are attached by their one end to the kink 18 or 19 at a distance from its bearing point 24 or 25, respectively, on the seat frame 12 and are pivotably secured by their other end, at a distance apart, to the base frame 16. The link 18 in the front link mechanism 14 is configured as a two-armed, symmetrical, arc-shaped lever 26; the link 19 in the rear link mechanism 15 is configured as a disc 27 or a partial disk 27' (FIG. 7) whose centerpoint is at the bearing point 25 on the seat frame 12.

Figure 2:
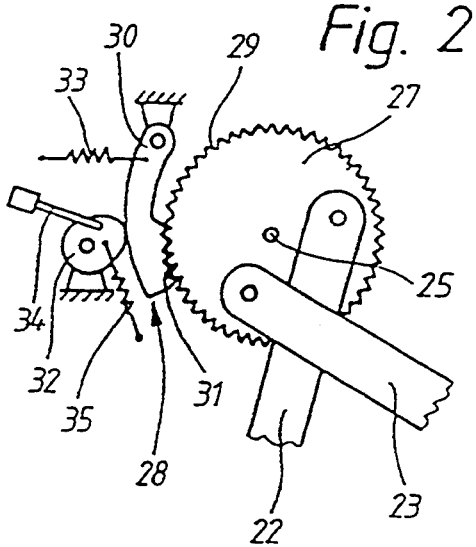
FIG. 2 is an enlarged, isolated side view showing details of a rear link mechanism with locking unit of the adjusting device of FIG. 1.

The disc 27 forming the link 19 in the rear link mechanism 15 interacts with a locking unit 28 (FIG. 2) and is provided with, for this purpose, an arc-shaped toothed segment 29 formed in one piece with the disc 27, which toothed segment is part of the locking unit 28. Also forming part of the locking unit 28 is a toothed pawl 30, which is pivotably secured to the seat frame 12 and has a plurality of locking teeth 31 which are arranged to engage positively into the series of teeth on the toothed segment 29. By way of a locking cam 32, the toothed pawl 30 can be locked in its engagement position or released. If the toothed pawl 30 is freed by the locking cam 32, it is lifted by a lifting spring 33 out from the toothed segment 29 and the disc 27 is freed for rotational movement.

The locking cam 32 is formed by an eccentric cam which is rotatably mounted on the seat frame 12 and can be twisted by a hand lever 34 against the force of a return spring 35, thereby freeing the toothed pawl 30 so that it can be lifted out by the lifting spring 33. If the hand lever 34 is let free, the return spring 35 rotates the locking or eccentric cam 32 back into its basic position and, in so doing, locks the toothed pawl 30 in its engagement position in the toothed segment 29. The lifting spring 33 can be omitted, provided that the angles of the tooth flanks in the series of teeth are of such a nature that no self-locking occurs. In this case, the toothed pawl 30 is forced out by the tooth flanks of the series of teeth on the toothed segment 29.

In lieu of the hand lever 34 firmly connected to the locking or eccentric cam 32, the locking or eccentric cam 32 can be coupled kinematically to the backrest 13 such that, when the backrest 13 is swivelled forward in the direction of the seat cushion 11, the locking cam 32 is rotated, out of its position locking the toothed pawl 30, against the force of the return spring 35. When the backrest 13 is swivelled back, the locking or eccentric cam 32 is guided back by the return spring 35 into its basic or locking position.

The seat adjusting device works as follows. By swiveling the hand lever 34 in a counter-clockwise direction or by folding the backrest 13 forward, the eccentric cam 32 is rotated against the force of the return spring 35 and gradually frees the toothed pawl 30 for pivotal movement. The lifting spring 33 lifts the toothed pawl 30 out from the toothed segment 29, and the disc 27 is freed. The vehicle seat can now be displaced. By an extreme displacement movement forwards, a sufficiently wide space is then cleared behind the backrest, which space allows comfortable passage to the additional passenger positions, situated behind the vehicle seat, of a two-door vehicle. A smaller displacement movement of the seat frame 12 enables the seat cushion 11 to be adjusted in the longitudinal direction, in a straight line or with superimposed adjustment for height and inclination. Also, a plurality of different path lines can be represented by variation of the lifting lengths of the links 18, 19 and of the lengths of the cross-links 20–23, and by the positioning of their hinge points. If some of the hinge points of the links and cross-links are adjustably configured, then even extreme height and inclination adjustments can be realized.

Figure 3:
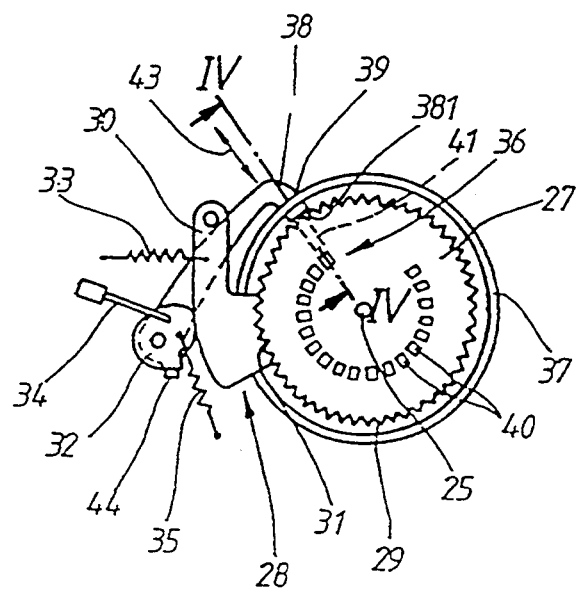
FIG. 3 is a view similar to FIG. 2 but showing the same adjusting device as in FIG. 2, with a mechanical memory.

In order to ensure that the vehicle seat 10, following extreme displacement forwards to provide access to the rear vehicle positions, recovers its previously set original position, there is installed in the rear link mechanism 15 a mechanical memory 36, as schematically represented in FIG. 3. The memory 36 exhibits a connecting link 37, which is disposed concentrically to the disc 27 and is rotatable relative to the latter, and a locking pawl 38, which is pivotably mounted on the seat frame 12 and is able to engage into a radial recess 39 in the connecting link 37. The engagement is effected by spring force. In the disc 27, a plurality of memory holes 40 are disposed equidistantly on a circular path.

Figure 4:
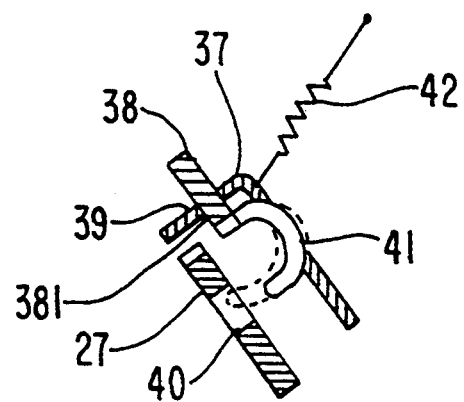
FIG. 4 is a sectional view along line IV—IV in FIG. 3 with the dashed lines showing the position of a memory pawl pivoted into a memory hole of a disc.

As can be seen from the sectional representation in FIG. 4, there is pivotably secured to the connecting link 37 a memory pawl 41, which, provided pivotability is not obstructed, swivels under the pretensioning of a spring 42 into one of the memory holes 40 and thereby creates a non-rotatable connection between the disc 27 and the connecting link 37. The locking pawl 38 and the memory pawl 41 are associated with each other such that, when the locking pawl 38 engages into the connecting link recess 39, the locking lug 381 of the locking pawl 38 presses against the outer lever arm of the memory pawl 41 and pivots the latter against the force of the spring 42. As a result, the memory pawl 41 is lifted out of the assigned memory hole 40 and the firm connection between the connecting link 37 and the disc 27 is terminated again.

For the purpose of lifting out of and engaging into the connecting link recess 39, a reversible force F acts upon the locking pawl 38, as this force is symbolized by the double arrow 43 in FIG. 3. This force F can be applied either manually, e.g. by a hand lever, or by the pivotal movement of the backrest 13. The locking pawl 38 has a driving journal 44 which is disposed such that, upon the lift-out pivotal movement of the locking pawl 38, the driving journal 44 rotates the eccentric cam 32, so that the toothed pawl 30 of the locking unit 28 is freed and is swivelled by its lifting spring 33 out from the toothed segment 29. At the same time as the locking pawl 38 is lifted out of the connecting link 37, the disc 27 is also thereby freed for rotational movement. As a result of the return force of the return spring 35, the spring force is in turn applied, by the eccentric cam 32 and the driving journal 44, to the locking pawl 38 for its engagement into the connecting link recess 39.

The seat adjusting device having a mechanical memory 36 works as follows. For normal seat adjustment, the hand lever 34, as already described, is pivoted counter-clockwise and releases, via the locking cam 32, the locking device 28. The lifting spring 33 lifts the toothed pawl 30 with its locking teeth 31 out from the toothed segment 29 and the disc 27 is freed for rotational movement. In the desired seat position, the hand lever is freed, as a result of which the return spring 35 rotates back the locking cam 32, which, in its basic position, locks the locking pawl 30 back into its engagement position in the toothed segment 29.

If the vehicle seat 10 is intended to be pushed forward out of this position to provide access to the rear seating positions, then the force F according to the arrow 43 in FIG. 3 is applied, as a result of the forward folding movement of the backrest 13, to the locking pawl 38. Upon the pivoting of the locking pawl 38, its locking lug 381 leaves the recess 39 in the connecting link 37 and frees the memory pawl 41, which, for its part, is swivelled by the force of the spring 42 into a memory hole 40. The connecting link 37 is thereby connected non-rotatably to the disc 27. When the locking pawl 38 is pivoted, its driving journal 44 rotates the locking cam 32 counter-clockwise, whereby the latter frees the toothed pawl 30 so that it can be lifted out by the lifting spring 33. The vehicle seat 10 is thereby released and can be pushed right forward. When the seat 10 is displaced, the connecting link 37 rotates jointly with the disc 27 and has the effect of allowing the locking pawl 38 to engage into the recess 39 in the connecting link 37, only when the vehicle seat 10 is back in its original position. Upon the engagement of the locking pawl 38, the coupling of the connecting link 37 and disc 27 is terminated again by the memory pawl 41.

Figure 5:
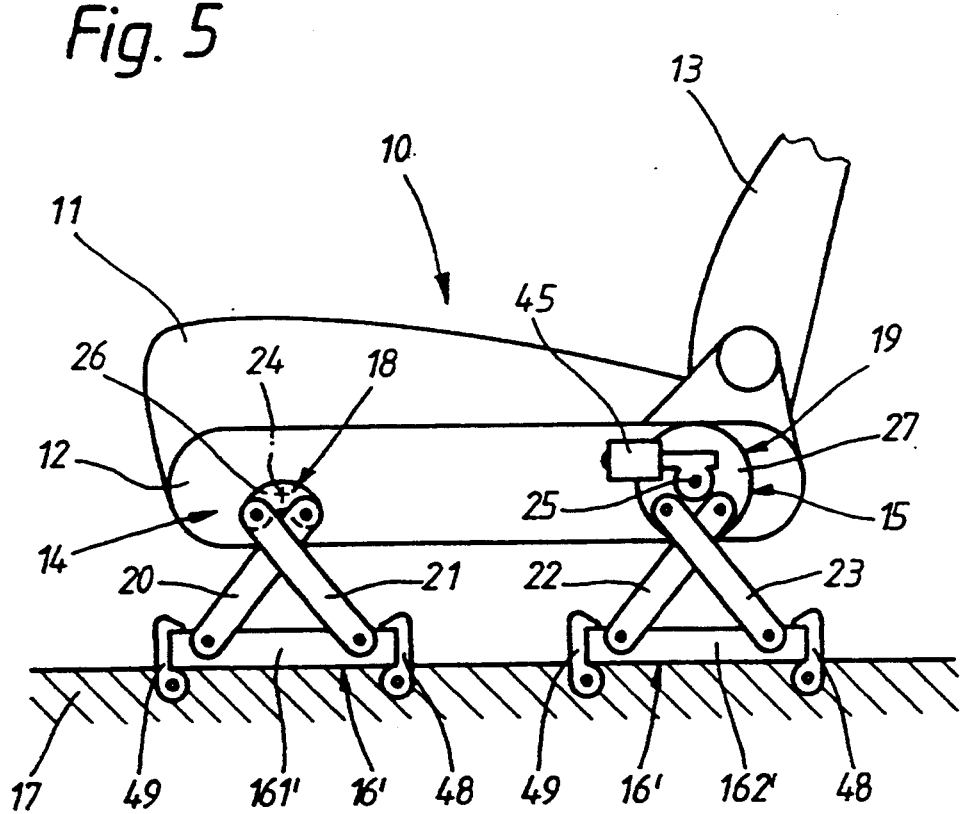
FIGS. 5 and 6 are side views of a vehicle seat with seat adjustment according to two further contemplated embodiments of the present invention.

A motor drive mechanism can be provided for the seat adjustment, as seen in FIG. 5. The motor drive mechanism can be in the form of a geared motor 45, on whose output shaft the link 19 is non-rotatably seated. It is also conceivable to drive the link 19 by a tumble fitting, as is known in principle in relation to seatback adjusters. In this case, the link 19 can simultaneously be a toothed part of the tumble fitting. On the eccentric pin of the tumble fitting, there is seated a handwheel or a servo drive mechanism.

As can be further seen from FIG. 5, in the case of the seat adjusting device outlined there, the base frame 16' is configured in two parts. Each frame part 161', 162' is detachably fixed by tensioning hooks 48, 49 to the vehicle floor 17. Simple releasing of the rear frame part 162' enables the vehicle seat 10 to be folded forward by way of the links 18 and cross-links 20, 21 of the front link mechanisms 14. When the tensioning hooks 48, 49 on the front frame part 161' are loosened, a corresponding pivotal movement of the vehicle seat 10 backwards is possible. By releasing both the frame parts 161', 162', the vehicle seat 10 can be removed from the vehicle.

Figure 6:
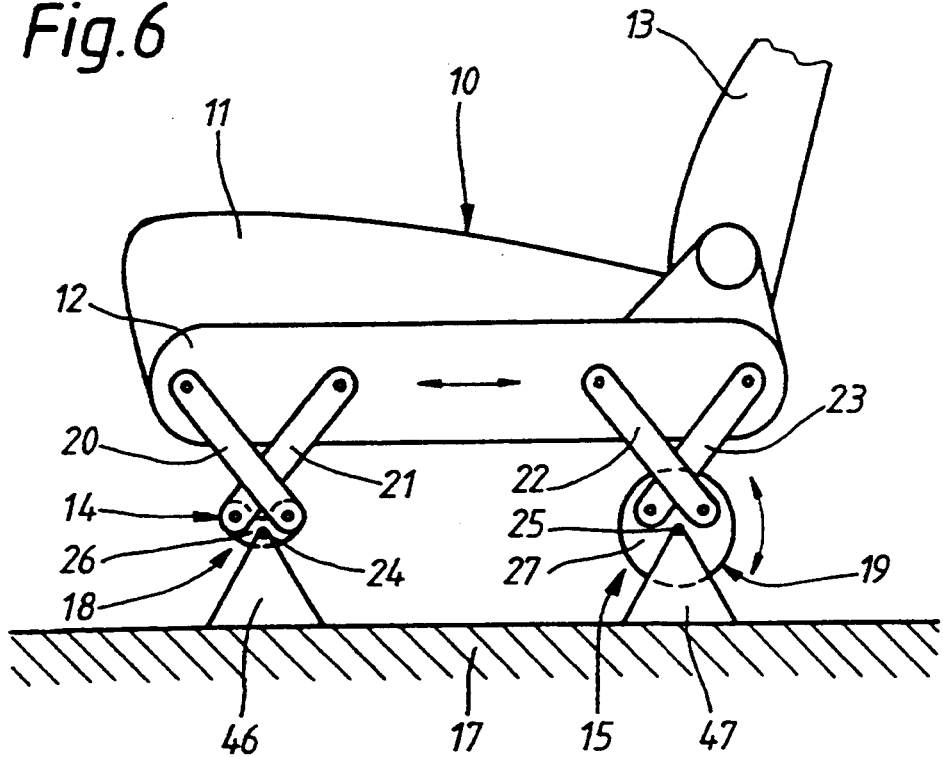

The vehicle seat 10 having a seat adjusting device shown in FIG. 6 is modified in relation to the vehicle seat described with respect to FIG. 1, insofar as the bearing points 24, 25 of the links 18, 19 in the link mechanisms 14, 15 are not disposed on the seat frame 12, but on fixtures 46, 47 firmly connected to the vehicle floor 17. Correspondingly, the cross-links 20–23 are not attached at their end sides to the vehicle floor 17 or to a base frame connected to the vehicle floor, but to the seat frame 12. Otherwise, the structure and operation of the seat adjusting device on the vehicle seat 10 in FIG. 6 are consistent with the seat adjusting device described above.

Figure 8:
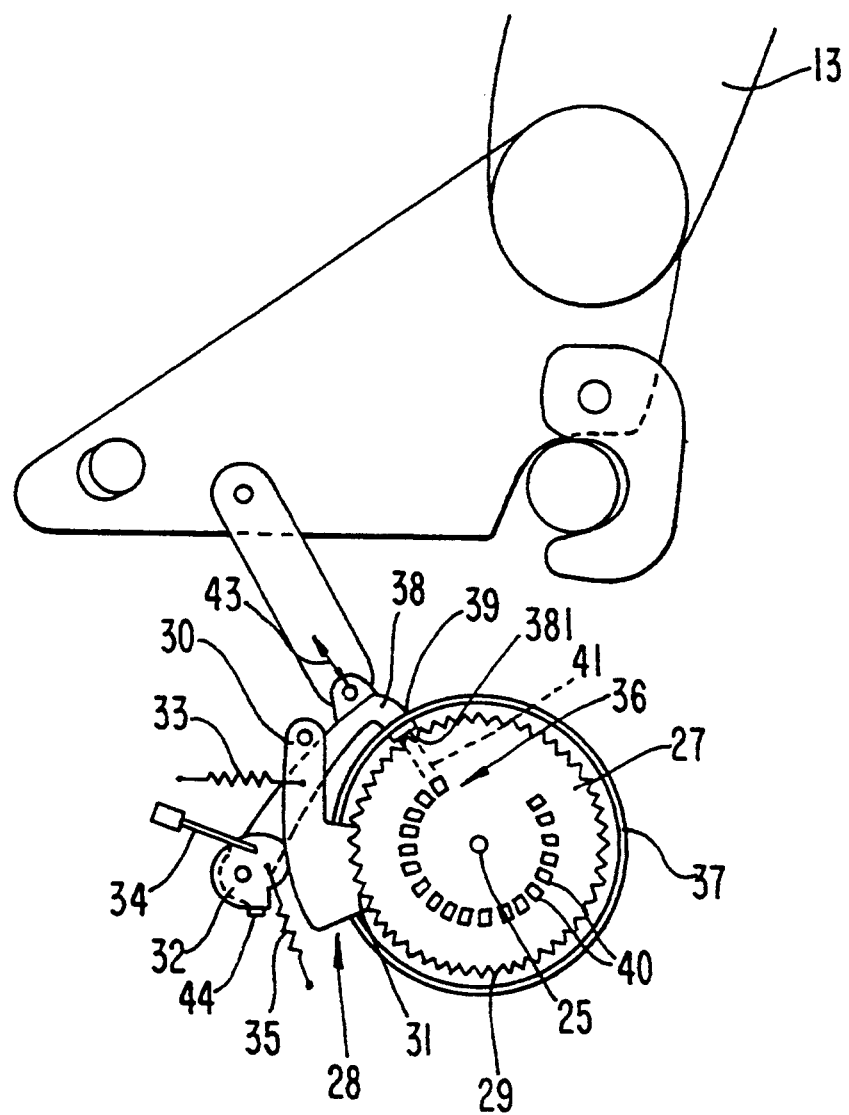
FIG. 8 is a view similar to FIG. 3, but showing a conventional linkage for connecting the locking unit to backrest.

FIG. 8 shows a conventional linkage for connecting the locking unit 28 to a backrest 13 such that, when the backrest is swivelled forward towards the seat cushion, the locking pawl 38 is rotated away from the connecting link 37 and causes the eccentric locking cam 32 to rotate away from the toothed pawl 30 to free the toothed pawl so that it can be lifted away from the toothed segment 29 and, when the backrest 13 is swivelled back into an upright position, the eccentric locking cam 32 is rotated against the toothed pawl 30 so that the toothed pawl is locked against the toothed segment 29.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A device for adjusting a seat of a motor vehicle wherein the seat includes a cushion-receiving seat frame, the device comprising link mechanisms arranged near front and rear ends of said cushion-receiving seat frame and mounted upon longitudinal sides thereof for adjustable securing of the seat to a vehicle floor, and a locking unit engaging into at least one of the link mechanisms for locking seat movement in a desired seat position, wherein each of the link mechanisms has a link pivotably mounted on one of the seat frame and the vehicle floor and two mutually intersecting cross-links, each cross-link being attached at a first end to the link at a distance from a bearing point of the link, and each cross-link being pivotably secured at a second end, which is spaced apart from the second end of the other cross-link, to the other one of the vehicle floor and the seat frame, the locking unit being operatively arranged to act upon at least one of the links such that, upon release of the locking unit, longitudinal displacement of the seat is permitted.

2. The device according to claim 1, wherein the mounting of one of the links and the two cross-links on the vehicle floor is effected on a one-part base frame which is removably secured to the vehicle floor.

3. The device according to claim 1, wherein the mounting of one of the links and the two cross-links on the vehicle floor is effected on a base frame comprising a frame part which is detachably connected to the vehicle floor.

4. The device according to claim 1, wherein the mounting of one of the links and the two cross-links on the vehicle floor is effected directly on the vehicle floor.

5. The device according to claim 1, wherein at least one link is configured as one of a full and partial disc, and the locking unit has a circular-arc-shaped toothed segment rigidly connected to the disc, a toothed pawl engaging into the toothed segment and pivotally secured to the same one of the seat frame and the vehicle floor as a link, and a manually-operable locking cam operatively engaged with the tooth pawl for selectively locking the toothed pawl in and freeing the toothed pawl from its engagement with the toothed segment of the disk.

6. The device according to claim 5, wherein the toothed pawl is operatively connected with a lifting spring exerting load upon the toothed pawl in a direction in which the toothed pawl is lifted away from the toothed segment.

7. The device according to claim 5, wherein the toothed segment and the disc are one piece.

8. The device according to claim 5, wherein the locking cam is a pivotably mounted eccentric cam with a hand lever coupled thereto for rotational movement.

9. The device according to claim 8, wherein a return spring is connected to the eccentric cam and biases the cam into a basic position against the toothed pawl.

10. The device according to claim 9, wherein the seat has a seat cushion and a backrest arranged to be swivelled forward out of a usage position onto the seat cushion, and the eccentric locking cam is coupled for rotational movement to the backrest such that, when the backrest is swivelled forward towards the seat cushion, the eccentric locking cam is rotated away from the toothed pawl and the toothed pawl is freed so that it can be lifted away from the toothed segment and, when the backrest is swivelled back into an upright position, the eccentric locking cam is rotated against the toothed pawl so that the toothed pawl is locked in the toothed segment.

11. The device according to claim 5, wherein the seat has a seat cushion and a backrest arranged to be swivelled forward out of a usage position onto the seat cushion, and the locking cam is an eccentric cam coupled for rotational movement to the backrest such that, when the backrest is swivelled forward towards the seat cushion, the eccentric locking cam is rotated away from the toothed pawl and the toothed pawl is freed so that it can be lifted away from the toothed segment and, when the backrest is swivelled back into an upright position, the eccentric locking cam is rotated against the toothed pawl so that the toothed pawl is locked in the toothed segment.

12. The device according to claim 5, wherein a connecting link is arranged concentrically to the disc and is rotatable relative to the disc, the connecting link has a radial recess and a locking pawl is releasably engaged in the recess wherein the locking pawl is mounted on the same one of the seat frame and the vehicle floor as the link and a plurality of memory holes disposed in a circular path on the disc, with a memory pawl pivotably secured to the connecting link, which memory pawl, as a result of spring pretensioning, is releasably engaged at one end thereof into the memory holes to establish a non-rotatable connection between the disc and the connecting link, the locking pawl being associated with the memory pawl such that the locking pawl, upon its engagement into the connecting link recess, has a portion which extends through the connecting link recess and contacts an end of the memory pawl to pivot the memory pawl out of the memory hole and, upon being pivoted out of the connecting link recess, said portion of the locking pawl moves away from the memory pawl and frees the memory pawl to engage into one of said memory holes, the locking pawl being arranged relative to the connecting link recess and being manually actuated for being lifted out and engaged into the connecting link recess, and the locking pawl being coupled to the locking cam for locking and releasing the toothed pawl such that the toothed pawl is locked against the toothed segment when the locking pawl is engaged in the connecting link recess, and is freed from the toothed segment when the locking pawl is pivoted out of the connecting link recess.

13. The device according to claim 12, wherein the locking pawl has a driving journal, which, when the locking pawl is lifted out of the connecting link recess, rotates the locking cam configured as an eccentric cam.

14. The device according to claim 12, wherein the seat has a seat cushion and a backrest arranged to be swivelled forward out of its usage position onto the seat cushion, and the locking pawl is coupled to the backrest such that, when the backrest is swivelled forward out of the connecting link recess, the locking pawl is lifted out of the connecting link recess, and when the backrest is swivelled back, the locking pawl is freed to engage into the connecting link recess.

15. The device according to claim 1, wherein a drive mechanism is connected to the link of at least one of the link mechanisms, and the drive mechanism is a geared motor.

* * * * *